INVENTORS
Joseph J. Kovaleski
Gordon L. Bauer
BY
AGENT

United States Patent Office 3,425,647
Patented Feb. 4, 1969

3,425,647
WIRE TAKE-OFF DEVICE
Joseph J. Kovaleski, Trumbull, and Gordon L. Bauer, Shelton, Conn., assignors to The Advanced Wyrepak Company, Inc., Bridgeport, Conn., a corporation of Connecticut
Filed Oct. 24, 1966, Ser. No. 589,061
U.S. Cl. 242—128                10 Claims
Int. Cl. B65h 49/02, 57/18; D01h 13/04

ABSTRACT OF THE DISCLOSURE

A rotary take-off device for use in unreeling wire past one end of a supply spool, said device being in the form of a turnable wheel rotatably mounted coaxial with and flat against the end of the spool. The wheel has a smooth, rounded periphery against which the wire presses. The wire, as it moves past the wheel, goes to a guide button which is coaxial with the spool and wheel and spaced from the latter. A plurality of flexible, radially extending slender tines have a mounting on the common axis of the guide button and wheel close to the latter. The tines extend past and lightly engage the wheel periphery but do not stop the wheel from turning. Instead they tend to control the unreeling movement of the wire which brushes past the tines one after another.

---

This invention relates to the take-off of wire from spools, reels and the like, and more particularly to wire take-off devices intended to facilitate the removal of spool-carried wire.

One type of prior wire take-off device comprises a stationary disk disposed against the free or unsupported end of a spool of wire, said disk having flexible fingers or tines extending radially past its peripheral portions. The wire being unreeled passed around the disk periphery, brushing past the flexible fingers which tended to hinder the wire and prevent its free movement.

Another type of prior take-off device comprises a rotary flyer consisting of one, two or more arms which rotate about the spool axis at the free end thereof.

While these prior devices served useful functions they did not at all times prevent looseness and kinking of relatively thin wire, and thus were of limited utility.

The present invention obviates the disadvantages of these prior devices, and objects of the invention are to provide an improved wire take-off device which is especially effective in preventing looseness and kinking of unreeling wire as the speed slacks off or the wire is halted; to provide a take-off device as above, which is particularly simple and flexible in operation and installation, being adaptable to various, different types of equipment; to provide a device as characterized, which is reliable and foolproof in operation, economical to produce, and useable with a wide range of wire sizes and speeds.

Other features and advantages will hereinafter appear.
In the drawings.

Figures 1, 2:
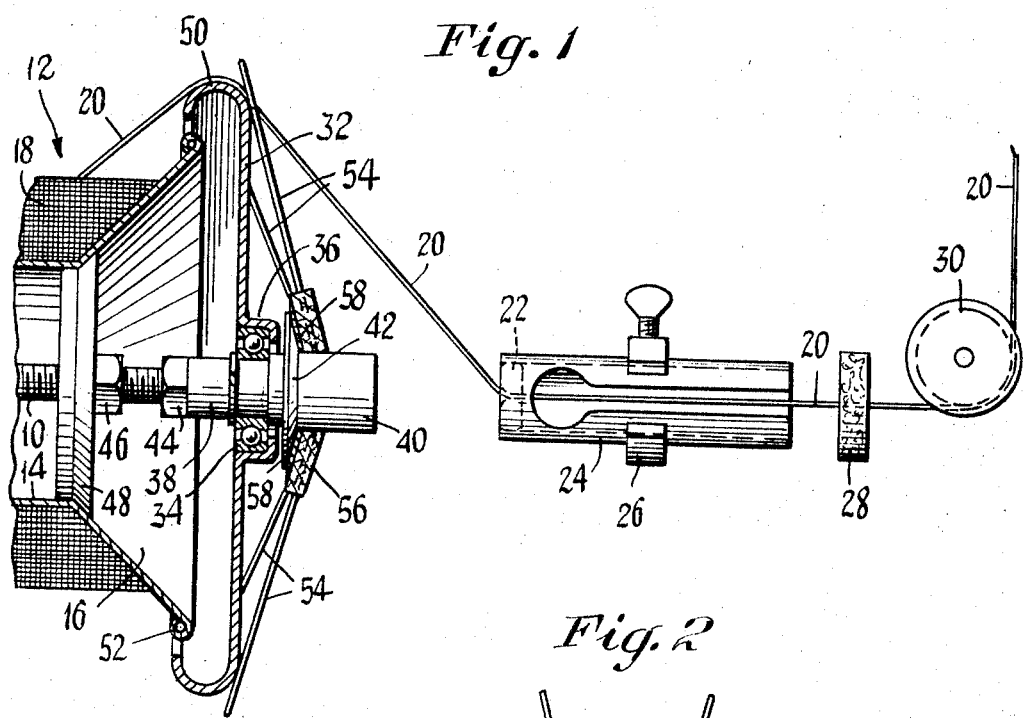
FIG. 1 is an axial sectional view of the improved wire take-off device as provided by the invention, incorporated in an unreeling mechanism.
FIG. 2 is an elevational flat-side view of a stationary wire restraining means constituting a portion of the take-off device.

Referring to the drawings, there is illustrated a spool support comprising a stationary mandrel 10 on which a spool of wire 12 is mounted. The spool of wire 12 comprises a bobbin or reel 14 having a flared or conical end 16, the spooled wire being indicated at 18. The flared end 16 is shown as being free in space, that is, unattached to any support except at its center to the mandrel 10, whereby a wire strand 20 may be unwound from the supply 18 by pulling the strand axially away from the spool past the free end 16 thereof.

After leaving the spool 12, the strand of wire passes through a ceramic bushing 22 which is carried in and at one end of a tubular support or guide 24. The guide 24 is mounted in any suitable way, as for example by means of a usual type of clamp 26. From the guide 24 the wire 20 passes between a pair of felt support and friction members 28 and over a sheave 30 to a capstan (not shown) or other pulling device.

In accordance with the present invention there is provided at the free end 16 of the spool 12 an improved take-off device, by which looseness and kinking of the wire 20 is virtually completely prevented during conditions of slow take-off, or halting of the wire. The take-off device comprises a wheel 32 which is rotatably carried by the support or mandrel 10, as by means of an anti-friction bearing assemblage 34 nested in an offset central portion 36 of the wheel. The bearing assemblage 34 is mounted on a stepped sleeve having a small diameter portion 38 and a large diameter portion 40 separated by a conically faced annular flange 42. The sleeve 38 is screwed onto the mandrel 10 and secured by a lock nut 44. The mandrel 10 has a second nut 46 engaging a flanged disk 48 by which the spool 12 is held in place.

By the present invention the wheel 32 is arranged to rotate under the action of the strand 20, and is provided with a rounded peripheral flange 50 which, as shown, preferably encircles or surrounds the beaded periphery 52 of the spool end 16. With such arrangement, the wire 20 which is being unreeled engages the peripheral flange 50 of the wheel 32, and sufficient friction exists to enable the wire by virtue of its unwinding movement, to cause rotation of the wheel 32.

Further, in accordance with the invention there is provided a plurality of substantially radially disposed spoke like tines 54 of somewhat stiff yet flexible characteristic, said tines having a conical disposition and lightly engaging the peripheral portion of the wheel 32. The pressure of the tines 54 on the wheel 32 is so light that virtually no resistance to turning occurs, whereby the unreeling wire 20 readily effects rotation of the wheel.

The tines 54 may be of any suitable material, that preferred at present being nylon plastic having a size of about $\frac{1}{16}$ of an inch diameter. As provided by the invention, the tines 54 are mounted by their inner ends being imbedded in a felt hub or ring 56 which is carried on the large-diameter portion 40 of the sleeve, said hub being secured against the conical surface of the annular flange 42 of the sleeve as by the use of a pressure sensitive tape disk 58. The use of felt for the hub 56 provides a desirable yield ability in the mounting, by which there is eliminated the likelihood of breakage of the tines.

As shown in FIG. 1, the tines 54 extend slightly past the peripheral flange 50 of the wheel 32, and by virtue of their being mounted on the sleeve portion 40 of the tines are stationary whereas the anti-friction bearing mounting 34 for the wheel 32 enables the latter to readily turn under the action of the wire 20. During the unreeling of the wire strand, it will brush and be forced past the outer ends of the tines 54 causing these to flex in a peripheral direction, as will be understood.

With this construction there is had an advantageous control of the wire strand 20 whereby such strand may be readily unreeled from the spool 12 yet is restrained in its movement in a manner to prevent looseness and kinking if the wire speed should be reduced or if the wire should be halted. This is because the stationary mounting of the tines causes these to halt the wire or to provide a drag on the same during the slowing and stopping operation.

Because the tines 54 themselves do not rotate, it is impossible for them to follow the unwinding movement of the wire under the action of inertia when the wire speed is reduced or when the wire is stopped. The wheel 32, however, may continue to rotate for a short period when the wire is stopped, but this is of no significance inasmuch as the prevention of looseness and kinking results from the stationary condition of the tines in conjunction with the presence of the wheel flange 50 regardless of whether or not the latter is turning.

By actual test it has been ascertained that the above-described take-off device is especially effective in preventing such looseness and kinking. It is also seen that the take-off device is especially simple in its construction and economical to manufacture, and that it is rugged and reliable in use, and not likely to get out of order. The device is furthermore adaptable to various types of equipment, different spool constructions and the like, as may be understood.

Variations and modifications may be made within the scope of the claims, and portions of the improvement may be used without others.

What is claimed is:

1. A take-off device for use in unreeling wire from a spool without excessive looseness or kinking, comprising in combination:
    (a) a support adapted to fixedly mount the spool with one spool-end free,
    (b) a take-off wheel rotatably carried by said support, said wheel being coaxial with and adjacent said free end of the spool and extending radially at least to the rim portion of said one spool end to be engaged and rotated by wire which is unreeled from the spool past said end, and
    (c) a plurality of substantially radially disposed flexible slender spoke-like wire-restraining tines fixedly supported at their adjoining inner ends adjacent the axis of said wheel and extending generally radially outward alongside the wheel and past the periphery thereof, the outer end portions of said tines yielding to and being shifted peripherally by the unreeling wire and said wire being thereby restrained from wholly free travel around the periphery of the spool end, and being prevented from freely unwinding around the spool end and kinking during slow wire speeds or halting of the wire.

2. The invention as in claim 1, wherein:
    (a) the tines engage peripheral portions of the wheel under light pressure.

3. The invention as in claim 1, wherein:
    (a) the tines comprise stiff, yieldable plastic wires constituted as bristles.

4. The invention as in claim 1, wherein:
    (a) a hub is provided, constituting mounting means for said tines,
    (b) said hub comprising a thick ring in which the tines are imbedded.

5. The invention as in claim 4, wherein:
    (a) said tine-mounting ring comprises felt.

6. The invention as in claim 1, wherein:
    (a) said wheel comprises a sheet-metal disk having a peripheral portion constituted as a rounded flange.

7. The invention as in claim 6, wherein:
    (a) said rounded flange extends around the periphery of the free end of the spool.

8. The invention as in claim 6, wherein:
    (a) said wheel is constituted of sheet aluminum.

9. The invention as in claim 1, wherein:
    (a) said tines are conically disposed with their apex portions spaced from the wheel.

10. The invention as in claim 1, wherein:
    (a) said support is stationary and fixedly carries said tines.

References Cited

UNITED STATES PATENTS

| | | | |
|---|---|---|---|
| 2,258,153 | 10/1941 | Siebs | 242—128 |
| 2,647,704 | 8/1953 | Samler et al. | 242—128 |
| 2,935,274 | 5/1960 | Pearson | 242—128 |

LEONARD D. CHRISTIAN, *Primary Examiner.*

U.S. Cl. X.R.

57—106